Nov. 15, 1955  H. W. ROCKWELL  2,723,878
DUMP WAGON
Filed May 8, 1951  4 Sheets-Sheet 3
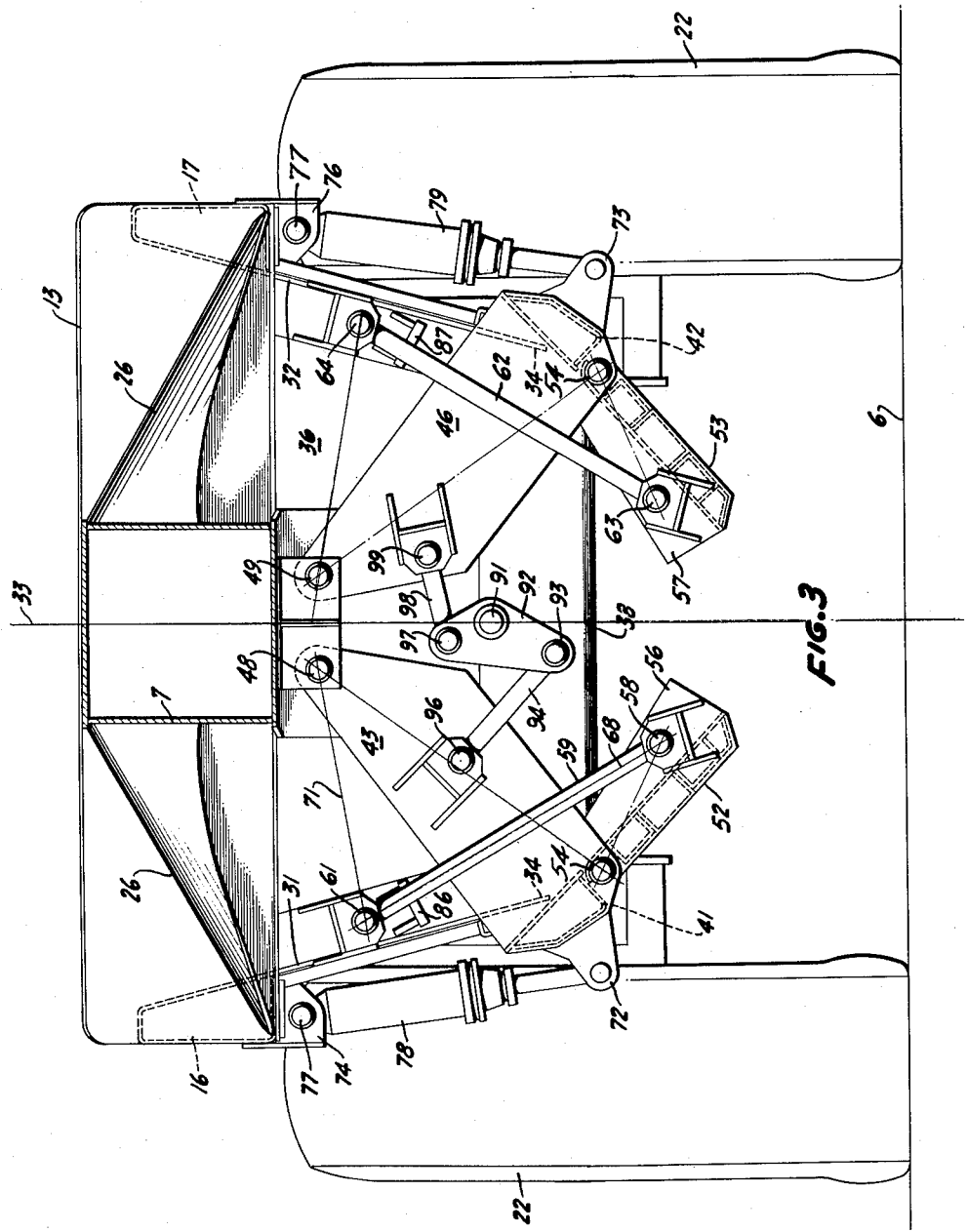
INVENTOR.
HARVEY W. ROCKWELL
BY Marcus Lothrop
ATTORNEY

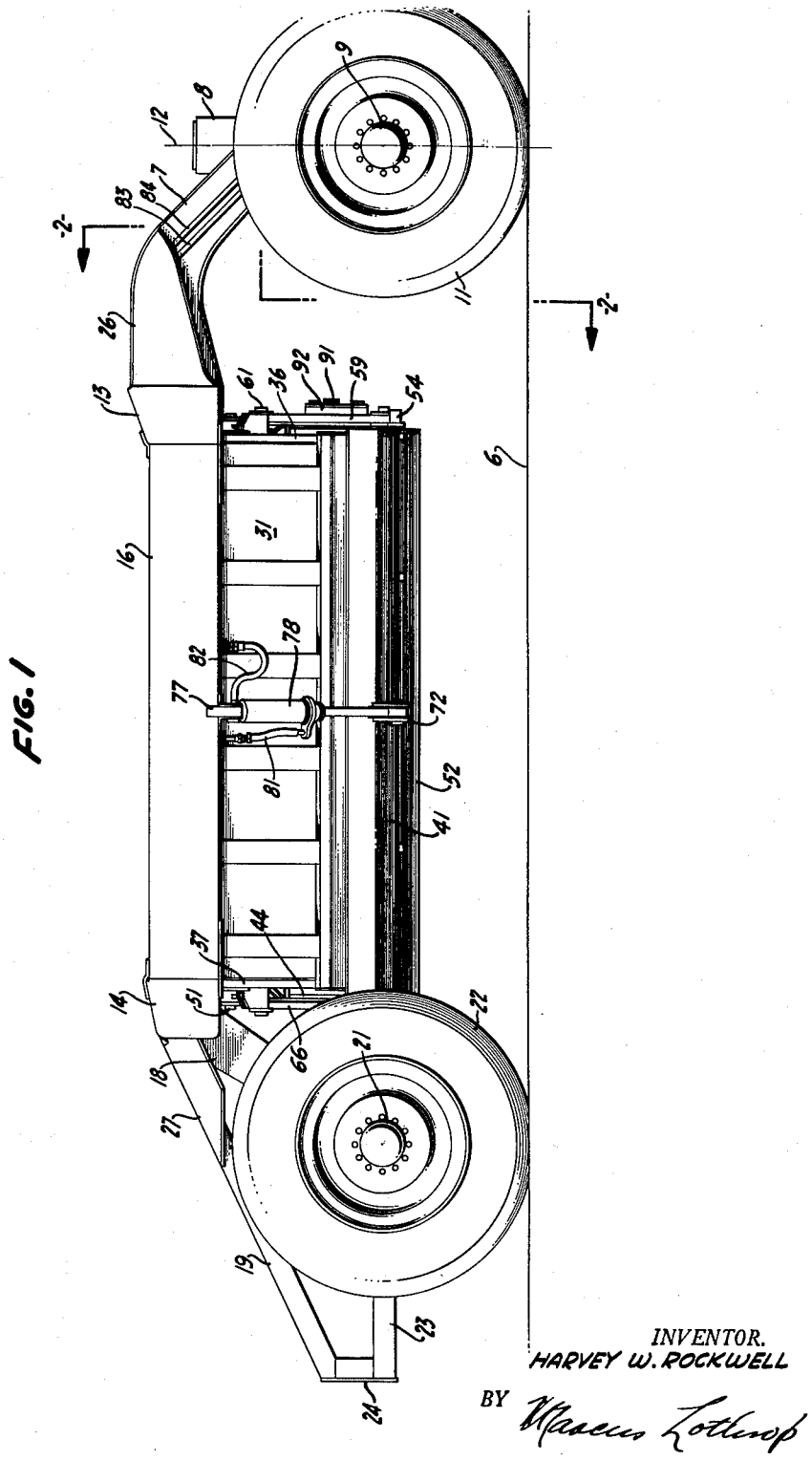

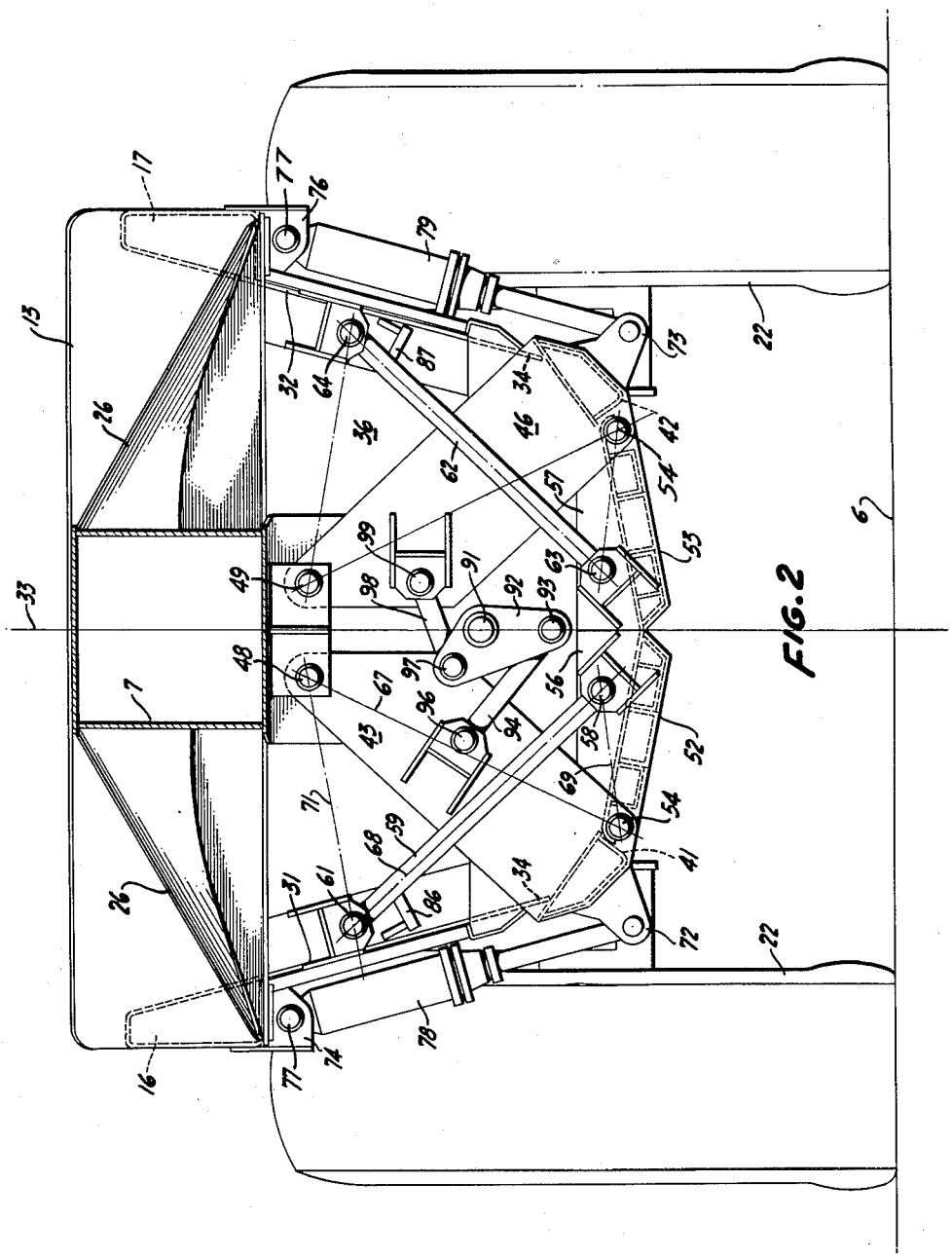

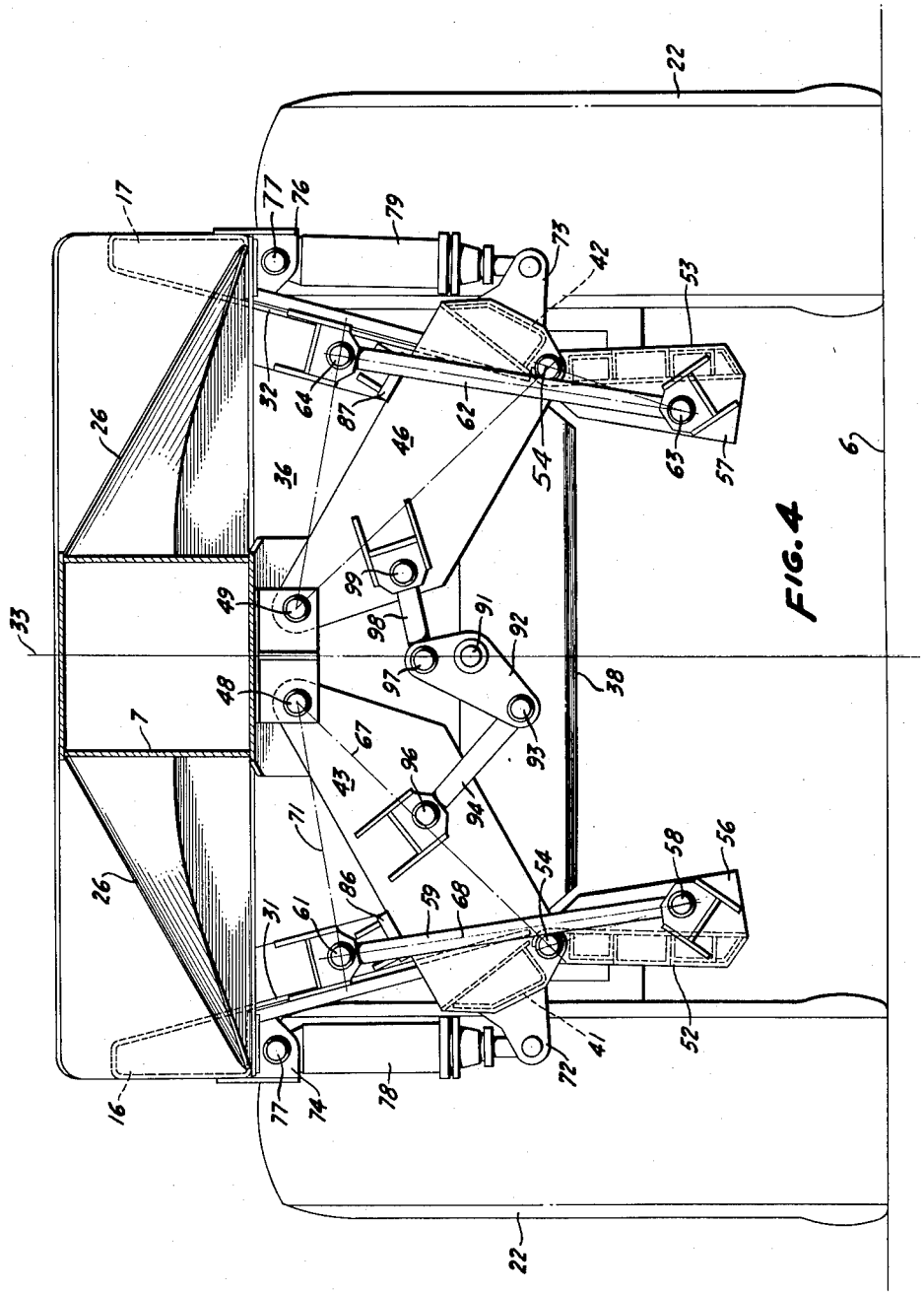

United States Patent Office 2,723,878
Patented Nov. 15, 1955

2,723,878

DUMP WAGON

Harvey W. Rockwell, Cedar Rapids, Iowa, assignor, by mesne assignments, to Allis-Chalmers Manufacturing Company, a corporation of Delaware Application May 8, 1951, Serial No. 225,087

9 Claims. (Cl. 298—36)

My invention relates to earth moving machinery and is especially concerned with a wagon supported on pneumatic tires and designed to be drawn or propelled by an auxiliary vehicle such as a tractor and effective for operation, preferably by hydraulic means, either to retain a load of earth or comparable material, or to discharge the material through the open bottom of the wagon in a satisfactory and reliable fashion. The wagon is loaded by some other instrumentality such as a power shovel.

It is an object of my invention in general to provide an improved dump wagon.

Another object of my invention is to provide a dump wagon effective to retain its load without undue strain on the retaining mechanism.

Another object of the invention is to provide a dump wagon effective to dump the load in such a manner that the dumped load will not interfere with the continued advance of the dump wagon.

A further object of the invention is to provide a dump wagon in which, after dumping, the bottom portions can be restored readily to their earth retaining locations.

A further object of the invention is to provide a dump wagon readily maneuverable by a tractor and readily operable, by remote control, by the operator of the tractor.

A still further object of the invention is to provide a readily manufactured, economical, rugged and smoothly operating dump wagon.

A still further object of the invention is to provide a dump wagon having relatively high ground clearance both in its carrying condition and in its dumping condition.

Other objects, together with the foregoing, are attained in the embodiment of the invention described in the accompanying description and illustrated in the accompanying drawings, in which:

Figure 1 is a side elevation of a dump wagon in closed or carrying position constructed in accordance with my invention and designed for draft by a forwardly attached tractor, not completely shown.

Figure 2 is a cross section, the planes of which are indicated by the lines 2—2 of Figure 1, the view being to an enlarged scale and showing the dump wagon in its earth retaining or closed condition.

Figure 3 is a cross section comparable to Figure 2 but showing the dump wagon in an intermediate position of discharge or return.

Figure 4 is a view comparable to Figures 2 and 3 showing in cross section the dump wagon in its fully opened condition.

The dump wagon of my invention is designed to be drawn over the ground 6 by any suitable device such as a two-wheel, pneumatically tired tractor or some other draft mechanism. The tractor normally includes an operator controlled supply of hydraulic fluid under pressure for actuation of instrumentalities on the dump wagon and likewise includes pneumatic mechanism for operating brakes on the dump wagon. These latter devices are not illustrated in detail since they are substantially standard.

A gooseneck 7 terminating in a hitching pedestal 8 at its forward end is articulated on an axle 9. At its opposite ends the axle is journalled in pneumatically-tired front wheels 11 resting on the ground 6. The wheels 11 are effective to swing about the vertical axis 12 of the pedestal 8 in order that the vehicle may be appropriately steered and are also free, usually, to swing about a fore and aft horizontal axis.

The gooseneck 7 arches upwardly and rearwardly from the pedestal 8 and is incorporated in the general frame of the dump wagon. The frame includes a forward cross beam 13, a rearward cross beam 14, and a pair of side beams 16 and 17. These beams, when seen in plan, form a generally rectangular frame. They are preferably of hollow box construction. Adjacent the rearward cross beam 14 the frame is continued by struts 18 and braces 19 to support the rearward portion of the load on a rear axle 21. This is journalled in pneumatically-tired, ground engaging rear wheels 22. A brace 23 from the rear axle 21 extends to a push plate 24 so that if desired, an abutting pusher can assist in propelling the dump wagon.

Since the dump wagon is usually loaded from overhead either by a power shovel, by a conveyor or the like, the frame includes also generally curved reenforcing shrouds 26 extending between the forward cross beam 13 and the gooseneck 7 and rearward shrouds 27 extending between the rearward cross beam 14 and the braces 19. All of the shrouds protect the mechanism beneath them from falling earth and the rearward shrouds 27 serve also as mud guards for the rear wheels 22.

To augment the earth confining capacity of the frame, the side beams 16 and 17 are extended downwardly and in a longitudinal direction by a pair of side walls 31 and 32. Much of the structure is symmetrical about a vertical, longitudinal central plane 33. Parts of the structure occurring on one side are duplicated on the other side so that the description of one side applies to the other side as well.

The side wall 31, for example, is generally planar and is preferably comprised of a metallic sheet reenforced externally by welded on channels. The side wall terminates in a rather sharp lower horizontal edge 34 ending at a point above the ground 6 slightly higher than the axles 9 and 21. The side walls 31 and 32 afford substantial ground clearance and are effective to retain the longitudinal dimensions of a substantial load of earth.

Extending between the side walls 31 and 32 is a forward wall 36 and a rearward wall 37, sometimes referred to as end walls. The forward and rearward walls 36 and 37 are fabricated of adequately reenforced plates and follow the general pattern of the side walls below the forward cross beam 13 and the rearward cross beam 14. However, the forward and rearward walls extend downwardly somewhat farther than the lower edge 34 of the side walls. Each of the forward and rearward walls 36 and 37 along its lower edge 38 (Figure 4) terminates in a strike off portion so that earth deposited by movement of the wagon either forwardly or rearwardly can be struck off to a set level.

To assist the side walls 31 and 32 to retain the load, they are provided with movable extensions. A longitudinally extending side panel 41 is disposed adjacent the side wall 31 whereas a comparable longitudinally extending side panel 42 is disposed adjacent the side wall 32. The side panel 41 is appropriately fabricated of a box section and at its ends includes or is connected to a forward support arm 43 and to a comparable rearward support arm 44 (Figure 1). The side panel 42 is provided with an appropriate forward support arm 46 and a similar rearward support arm. Since the forward construction and the rearward construction are substantially identical, the description and illustration of the forward arrangement apply equally to the rearward arrangement.

Disposed on the forward wall adjacent the central plane 33 are pivot pins 48 and 49 serving to mount the forward support arms 43 and 46 for swinging movement with respect to the frame. Similar pivots 51 are disposed on the rearward wall 37. With this arrangement the side panels 41 and 42 are free to swing in arcs about the axes of the pivot pins 48 and 49 on the outside of the side walls 31 and 32 between positions approximately above the lower edge 34 thereof and positions in which the side panels act as lower continuations of the side walls.

Additionally serving as continuations of the side walls are bottom panels 52 and 53. These are substantially identical and extend lengthwise beneath the frame, being constructed in a box arrangement containing shock absorbing material, such as wood, in the customary way. The bottom panel 52, for example, is connected by a series of pivot pins 54 to extensions on the side panel 41 and is similarly connected to the forward support arm 43 and the corresponding rearward support arm.

As further support, the bottom panel 52 at its opposite ends is provided with extensions. In the forward portion there is an upstanding front wall 56 while a comparable wall is disposed in the rear portion. Similarly, the bottom panel 53 has an upstanding front wall 57 and a corresponding rear wall. Connected to the front wall of the bottom panel 52 by a pivot 58 at an appropriate point is a forward link 59 extending to a suitably reenforced pivot connection 61 on the forward wall 36. A comparable forward link 62 is connected by a pivot 63 to the front wall 57 of the bottom panel 53 and is likewise connected by a pivot 64 to a reenforced mounting on the forward wall 36. Similar links 66 mounted correspondingly on the rearward wall 37 are provided for the rearward end of the structure.

The relationship of the pivot pin 48 and the pivot pin 54, for example, to the pivot 58 and the pivot connection 61 is such that a center line 67 connecting the pivot pins 48 and 54 crosses the center line 68 of the link 59 when the parts are in closed or raised earth carrying position. Furthermore, the center line 69 extending between the pivot pin 54 and the pivot 58 in that position of the parts is approximately parallel to the center line 71 extending between the pivot connection 61 and the pivot pin 48. This relationship is such that the downward component of a load borne by the bottom panel 52 is approximately in equilibrium. Little, if any, dislodging force is needed to lift the forward support arm 43 and its corresponding rearward arm and little force must be exerted to lift the side panel 41 connecting them. When the weight of the parts is taken into account in connection with the weight of the normal load, the design is such that the wagon tends to remain in closed position and does not tend to dump itself automatically. However, the proportions and relationships are such that the load is very nearly balanced and only a light force is necessary to move the side panels and the bottom panels.

Structure is provided for holding the parts positively in position against any random dislodging force and for moving the parts positively into a desired position. Each of the side panels 41 and 42, approximately midway of its length, is provided with one of two anchors 72 and 73 and each of the side beams 16 and 17, approximately midway of its length, is provided with a cooperating one of two anchors 74 and 76. Mounted on pivots 77 in the anchors are jacks 78 and 79. These are preferably expansible chambers sometimes pneumatic, being supplied from the brake system, but usually hydraulic. They are of the customary sort connected by flexible hydraulic hoses 81 and 82 and by conduits 83 and 84 to a control structure, not shown, on the tractor.

When the hydraulic circuits are appropriately operated, the jacks 78 and 79 are subjected simultaneously to equivalent pressure since they are interconnected. When appropriately actuated, the jacks lift the forward support arms 43 and the rearward support arms 44 so that the bottom and side panels proceed progressively through the intermediate position, illustrated in Figure 3, into the final open position, illustrated in Figure 4. As shown especially in Figure 4, the lower portions of the bottom panels have a substantial clearance above the ground and the bottom panels themselves in the extreme open position are substantially vertical. They define approximately vertical extensions of the side walls and serve as lateral confining members for earth being discharged from the wagon.

As stops for the structure in the extreme open position, there are provided on the forward and rearward walls suitable abutment blocks 86 and 87. In addition, the pivot pins 54 are extended for a length greater than necessary merely for pivoting so that they lie in the swinging paths of the links 59 and 62, these facilities being duplicated at the rearward portion of the vehicle. Thus, a rigid structure is provided in this extreme position, it being merely necessary for the jacks 78 and 79 to maintain sufficient pressure to hold the parts in the indicated location.

If the hydraulic jacks 78 and 79 are exactly equalized, not as to pressure but as to volume of hydraulic fluid instantaneously contained, the symmetrical, movable parts of the wagon will proceed in exact unison between their various selected positions. It is customary, however, to equalize hydraulic jacks by pressure rather than by volume. An additional mechanism is consequently provided to insure that the two symmetrical sides of the wagon move always into substantially symmetrical positions throughout their motion ranges. This mechanism is especially appropriate when the jacks are pneumatically actuated.

The structure for that purpose is preferably duplicated on the rearward wall 37 but is most clearly illustrated in connection with the forward wall 36. Disposed at the central plane 33 of the forward wall 36 is a fulcrum pin 91 serving as a mounting for an equalizer lever 92 having arms of unequal length. The longer, lower arm is joined by a pivot pin 93 to an equalizer link 94. A pivot pin 96 connects the equalizer link to a reenforced mounting on the forward support arm 43.

The shorter, upper arm of the equalizer lever 92 is comparably connected by a pivot pin 97 to an equalizer link 98 also joined by a pivot pin 99 to a reenforced mounting on the forward support arm 46. By this mechanism, the forward support arms for the two side panels and also the rearward support arms for the two side panels are mechanically interlinked. The proportions and locations of the pivot pins and the connecting parts are such that the lefthand portion of the movable mechanism occupies instantaneously a position closely comparable to that simultaneously occupied by the righthand portion of the mechanism despite variations in pressure of the hydraulic jacks 78 and 79. In fact, hydraulic force can be and is transmitted from one side of the wagon to the other through the mechanical interconnection so that in the event one of the jacks does not serve fully or at all, the remaining jack can still operate the structure.

From the foregoing description and upon reference to the drawings, it is seen that an improved bottom closure is provided for an open bottom dump wagon. The dump wagon has a support including side walls and end walls to which elements comprising a bottom closure are connected for support. The bottom closure is shown to include side panels 41 and 42, bottom panels 52 and 53, links 59, 62 and 66, pins 48 and 49, pivot pins 54, pivots 58, 61, 63 and 64, equalizer lever 92, links 94 and 98 and pivots 93, 96, 97 and 99.

Side panel 41 is disposed alongside and parallel to the lower edge 34 of the side wall 31. The side panel 41 is supported on the support by aligned pivot mountings including pivot pin 48 for vertical swinging movement relative to side wall 31. The side panel 41 pivots about a first axis, passing through pivot pin 48, which is spaced inwardly from side wall 31 and disposed above and parallel to side panel 41. The pivot mountings are located so that side panel 41 may swing from a closed to open position along an arc passing outwardly of side wall 31 immediately beneath the lower edge 34 thereof. Bottom panel 52 is disposed alongside the side panel 41 in generally edge opposed inwardly extending relation thereto.

Bottom panel 52 has an edge adjacent to the side panel 41 which is pivotally connected to side panel 41 by pivot pins 54, these pins being aligned on a second axis disposed in parallel relation to the beforementioned first axis. Link means in the form of links 59 have upper portions pivotally carried by the support through pivot connections 61 for swinging movement of links 59 about a third axis spaced above the bottom panel 52 and positioned between and parallel to the beforementioned first axis and side wall 31. Links 59 have lower portions pivotally connected with the bottom panel 52 on an axis parallel to and spaced inwardly from the beforementioned second axis. As shown in Fig. 4, the link means and the pivot connection between bottom panel 52 and side panel 41 coact to move the bottom panel 52 into a vertically depending position relative to the side panel 41 when the side panel 41 swings outwardly beneath the side wall 31 to its open position.

In accordance with the invention, there is provided a dump wagon suitable for use with heavy duty earth moving equipment, a wagon effective to retain its load when it is in closed position without substantial force being necessary to support the load, and a wagon equally effective to dump the load under precise control of the jacking mechanism. The dumped load is confined to a windrow or elongated pile substantially within the tracks made by the ground engaging wheels so that the load can be evenly deposited and levelled off without interfering with the forward or rearward progress of the dump wagon. The device is symmetrical and is arranged to operate uniformly despite variations in the hydraulic actuating mechanism or despite partial failure of the hydraulic system. The motions are accomplished by pivoted links so that frictional sliding engagements are not necessary and so that the various parts move with respect to each other with precision and without jamming or wedging. A generally improved dump wagon has been provided.

What is claimed is:

1. A dump wagon comprising a load-supporting frame including a pair of side beams and forward and rearward cross beams, side walls depending from said side beams, a forward wall depending from said forward cross beam, a rearward wall depending from said rearward cross beam, a pair of side panels, forward and rearward support arms on said side panels overlying said forward and rearward walls, pivot pins between said forward support arms and said forward wall and between said rearward support arms and said rearward wall, a pair of bottom panels, front walls on said bottom panels disposed to lie between said forward wall and said forward support arms, rear walls on said bottom panels disposed to lie between said rearward wall and said rearward support arms, pivot pins between said front wall and said forward support arms and between said rear wall and said rearward support arms, a pair of forward links each being pivoted to said forward wall and to one of said front walls, a pair of rearward links each being pivoted to said rearward wall and to one of said rear walls, a pair of jacks each being pivoted to one of said side beams and to one of said side panels, equalizer levers pivoted on said forward wall and on said rearward wall, and equalizer links pivoted to said equalizer levers and to said forward support arms and to said rearward support arms.

2. A dump wagon comprising an elongated load-support frame, a pair of side panels, means for mounting said side panels for pivotal movement about longitudinal axes with respect to said frame, a pair of bottom panels, means for mounting said bottom panels for pivotal movement about longitudinal axes with respect to said side panels, links mounted to pivot with respect to said frame and with respect to each of said bottom panels, an equalizer lever mounted to pivot with respect to said frame, equalizer links mounted to pivot with respect to said equalizer lever and with respect to each of said side panels, and a pair of jacks pivotally mounted on said frame and on said side panels.

3. A dump wagon comprising a support, a side panel, pivots connecting said side panel and said support, a bottom panel, pivots connecting said bottom panel and said side panel, a link, a pivotal connection between one end of said link and said support, a pivotal connection between the other end of said link and said bottom panel, a jack, a pivotal connection between one end of said jack and said support, and a pivotal connection between the other end of said jack and said side panel.

4. A dump wagon comprising a support including an elongated side wall and including end walls, a side panel disposed alongside said side wall, pivots aligned on a longitudinal axis and connecting said side panel and said end walls, a bottom panel disposed alongside said side panel, pivots aligned on a longitudinal axis connecting said bottom panel and said side panel, a pair of links, pivots on longitudinal axes connecting the correspoding ends of said links to said end walls, pivots on longitudial axes connecting the other ends of said links to said bottom panel, a jack, a pivot connecting one end of said jack to said side panel, and a pivot connecting the other end of said jack to said side wall.

5. A dump wagon comprising a support including elongated side walls and including end walls, a pair of side panels disposed alongside said side walls, pivots aligned on longitudinal axes connecting said side panels and said end walls, a pair of bottom panels disposed alongside said side panels, pivots aligned on longitudinal axes connecting said bottom panels and said side panels, a plurality of pairs of links, pivots on longitudinal axes connecting the corresponding ends of said links to said end walls, pivots on longitudinal axes connecting the other ends of said links to said bottom panels, a pair of equalizer levers, pivots on a longitudinal axis mounting said levers on said end walls, equalizer links, pivots on longitudinal axes connecting said equalizer links to said equalizer levers and to said side panels and actuating means for moving said bottom and side panels from a bottom closed position to a bottom opened position.

6. A dump wagon comprising a load-supporting frame including a side wall, a rearward wall, and a forward wall; a side panel; forward and rearward support arms secured to said side panel; pivots interconnecting said forward and rearward support arms with said forward wall and said rearward wall; said pivots mounting said side panel to swing below said side wall, said forward wall and said rearward wall; a bottom panel; a pivotal connection between one edge of said bottom panel and one edge of said side panel; a pair of links; pivot connections between one end of each of said links and said bottom panel away from said one edge thereof; pivot connections between the other end of each of said links and said rearward and forward walls; and a jack connected to said side panel and to said frame for moving said side panel and said bottom panel with respect to said frame.

7. In an open bottom dump wagon having a support including a side wall and end walls, a bottom closure comprising: a side panel disposed alongside and parallel to a lower edge of said side wall; pivot mountings supporting said side panel on said support for vertical swinging movement relative to said side wall about a first axis spaced inwardly from said side wall and disposed above and parallel to said side panel, said pivot mountings operatively associating said support and side panel to afford swinging movement of the latter from closed to open position along an arc passing outwardly of said side wall immediately beneath the lower edge thereof; a bottom panel disposed alongside said side panel in generally edge opposed inwardly extending relation thereto, said bottom panel having the adjacent edge thereof pivotally connected to said side panel on a second axis disposed in parallel relation to said first axis; link means having upper portions pivotally carried by said support for swinging movement about a third axis spaced above said bottom panel and positioned between and parallel to said first axis and said side wall, and having lower portions pivotally connected with said bottom panel on an axis parallel to and spaced inwardly from said second axis, said link means and the pivot connection between said side and bottom panels coacting to move said bottom panel into a vertically depending position relative to said side panel as the latter swings outwardly beneath said side wall to its said open position and actuating means for moving said side and bottom panels from closed to open positions.

8. In an open bottom dump wagon having a support including a side wall and end walls, a bottom closure comprising: a side panel disposed alongside and parallel to a lower edge of said side wall; pivot mountings supporting said side panel on said support for vertical swinging movement relative to said side wall about a first axis spaced inwardly from said side wall and disposed above and parallel to said side panel, said pivot mountings operatively associating said support and said panel to afford swinging movement of the latter from closed to open position along an arc passing outwardly of said side wall immediately beneath the lower edge thereof; a bottom panel disposed alongside said side panel in generally edge opposed inwardly extending relation thereto, said bottom panel having the adjacent edge thereof pivotally connected to said side panel on a second axis disposed in parallel relation to said first axis; link means having upper portions pivotally carried by said support for swinging movement about a third axis spaced above said bottom panel and positioned between and parallel to said first axis and said side wall, and having lower portions pivotally connected with said bottom panel on an axis parallel to and spaced inwardly from said second axis, said link means and the pivot connection between said side and bottom panels coacting to move said bottom panel into a vertically depending position relative to said side panel as the latter swings outwardly beneath said side wall to its said open position; and actuating means carried by said support and operatively associated with said panels for selectively moving same from a bottom closed position to a bottom open position.

9. In an open bottom dump wagon having a support including a side wall and end walls, a bottom closure comprising: a side panel disposed alongside and parallel to a lower edge of said side wall; pivot mountings supporting said side panel on said support for vertical swinging movement relative to said side wall about a first axis spaced inwardly from said side wall and disposed above and parallel to said side panel, said pivot mountings operatively associating said support and side panel to afford swinging movement of the latter from closed to open position along an arc passing outwardly of said side wall immediately beneath the lower edge thereof; a bottom panel disposed alongside said side panel in generally edge opposed inwardly extending relation thereto, said bottom panel having the adjacent edge thereof pivotally connected to said side panel on a second axis disposed in parallel relation to said first axis; link means having upper portions pivotally carried by said support for swinging movement about a third axis spaced above said bottom panel and positioned between and parallel to said first axis and said side wall, and having lower portions pivotally connected with said bottom panel on an axis parallel to and spaced inwardly from said second axis, said link means and the pivot connection between said side and bottom panels coacting to move said bottom panel into a vertically depending position relative to said side panel as the latter swings outwardly beneath said side wall to its said open position; and actuating means operatively connected to said support and to an outward edge of said side panel for selectively opening and closing said bottom closure by moving said side panel from said closed position to said open position and by moving said side panel from said open position to said closed position, respectively.

References Cited in the file of this patent
UNITED STATES PATENTS

| | | |
|---|---|---|
| 540,484 | Cropp | June 4, 1895 |
| 1,013,929 | Collins | Jan. 9, 1912 |
| 2,316,412 | French | Apr. 13, 1943 |
| 2,494,472 | De Saussure | Jan. 10, 1950 |

FOREIGN PATENTS

| | | |
|---|---|---|
| 28,117 | Great Britain | Dec. 6, 1913 |